United States Patent

Woosley

[11] Patent Number: 5,536,551
[45] Date of Patent: Jul. 16, 1996

[54] METHOD FOR BINDING TUFTS

[75] Inventor: Robert S. Woosley, Greenville, S.C.

[73] Assignee: JPS Automotive, Greenville, S.C.

[21] Appl. No.: 276,412

[22] Filed: Jul. 18, 1994

[51] Int. Cl.⁶ .............................. B32B 3/02; D05C 17/00
[52] U.S. Cl. ................. 428/92; 428/93; 428/95; 428/97
[58] Field of Search .......................... 428/92, 93, 97, 428/95

[56] References Cited

U.S. PATENT DOCUMENTS

| | | | |
|---|---|---|---|
| 2,331,321 | 10/1943 | Heaton | 28/4 |
| 2,528,129 | 10/1950 | Francis, Jr. | 154/54 |
| 2,705,880 | 4/1955 | Kinzinger et al. | 66/191 |
| 3,285,797 | 11/1966 | Harrison et al. | 161/67 |
| 3,325,323 | 6/1967 | Forkner | 156/72 |
| 3,347,736 | 10/1967 | Sissons | 428/92 |
| 3,348,993 | 10/1967 | Sissons | 161/67 |
| 3,476,636 | 11/1969 | Crosby | 428/92 |
| 3,717,524 | 2/1973 | Culp et al. | 156/72 |
| 3,889,028 | 6/1975 | Hösterey et al. | 428/88 |
| 4,093,763 | 6/1978 | Hartmann et al. | 428/97 |
| 4,258,094 | 3/1981 | Benedyk | 428/85 |
| 4,379,189 | 4/1983 | Platt | 428/89 |
| 4,439,476 | 3/1984 | Guild | 428/97 |
| 4,668,552 | 5/1987 | Scott | 428/92 |
| 4,668,553 | 5/1987 | Scott et al. | 428/92 |
| 5,182,162 | 1/1993 | Andrusko | 428/95 |
| 5,284,009 | 2/1994 | Tung et al. | 428/92 |

Primary Examiner—Terrel Morris
Attorney, Agent, or Firm—Henry S. Jaudon; Cort Flint

[57] ABSTRACT

A tufted pile fabric in which the pile yarns extend from a backing fabric to form the face of the fabric. The backing fabric comprises a fibrous substrate comprised of a blend of synthetic filaments having a high-melt temperature and synthetic filaments having a low-melt temperature. The pile yarns are also formed of a blend of synthetic low-melt filaments and synthetic high-melt filaments spun together. The filaments forming the pile yarn are cut into staple lengths prior to spinning. The low-melt filaments of the backing fabric and the pile yarn have the same melt temperature. The tufted pile fabric is subjected to sufficient heat during the tufting operation to cause the low-melt filaments to soften and to thermally bond the pile yarns with the backing fabric to provide a stable tufted pile fabric without a backing coating.

9 Claims, 3 Drawing Sheets

METHOD FOR BINDING TUFTS

BACKGROUND OF THE INVENTION

This invention relates to tufted pile fabrics, both cut and un-cut, which have a variety of applications for which they are suitable. The automotive industry particularly has a great need for light weight, low density tufted pile fabrics for use in covering trunk areas, floor areas, door panels, speaker covers, package shelves, etc. These fabrics must have good feel and at the same time the pile must be securely locked with the backing fabric.

In tufted pile fabrics, it is usual to bond the pile tufts with the backing fabric by passing the tufted fabric through a coating and bonding station. This practice is both time consuming and requires additional material and labor cost.

Attempts have been made to form tufted pile fabrics wherein the backing fabric is formed of a combination of fibers having high-melt and low-melt characteristics. In general, the object was to improve the quality of the backing fabric. See U.S. Pat. Nos. 3,325,323 and 4,258,094. Such attempts have not been successful in locking the tufts in position and normally backsizing or coating is still required.

There also have been efforts made to weave pile fabrics with the pile yarns being plied with strands of high-melt filaments wrapped with strands of low-melt filaments. These pile fabrics also require a back coating to firmly secure the pile with the base fabric. See U.S. Pat. Nos. 4,668,552 and 4,668,553.

The instant invention has as its object the formation of a stable tufted pile fabric which requires no back coating.

Another object of the invention is to provide a tufted pile fabric which exhibits reduced shedding during handling.

Another object of the invention is the provision of a stable tufted pile fabric in which the pile face has good hand or feel.

Another object of the invention is a stable tufted pile fabric where integral construction is finished on the tufting machine.

Another object of the invention is to provide a tufted fabric without backing but with enhanced wear properties.

Another object of the invention is the formation of a stable tufted pile fabric produced with a minimum of material and handling procedures.

SUMMARY OF THE INVENTION

The above objectives are accomplished according to the invention by providing a tufted pile fabric in which the pile yarns extend from a backing fabric to form the face of the pile fabric. The backing fabric is formed of a fibrous substrate. The substrate is comprised of a blend of synthetic filaments one of which has a high-melt temperature and the other a low-melt temperature. The pile yarns are formed of a blend of staple, synthetic low-melt filaments and high-melt synthetic filaments. These filaments are cut into staple length, blended and spun into yarns. The low-melt filaments of the pile yarns and the backing fabric are thermally bonded together and with the high-melt filaments of the pile yarn and the backing fabric to form a tufted pile fabric in which the pile yarns and the backing fabric are firmly secured. The tufted pile fabric of the invention does not require a backing coating to maintain stability of the pile tufts.

The pile yarns are formed with between 50% and 95% synthetic high-melt filaments and 5% and 50% synthetic low-melt filaments. The high-melt filaments are preferably of polyester or nylon and the low-melt filaments preferably of polypropylene or polyethylene. The backing fabric is formed of similar percentages of the high and low-melt synthetic filaments. The filaments forming the backing are either continuous or cut into staple. Should they be continuous filaments, they will be formed into a batt and jet bonded. Should the filament blend be of cut staple length, the fabric will be formed by needling the filaments together to form the backing fabric.

Preferably the low-melt filaments of the backing fabric and pile yarns have a melt or softening point of less than 340° F. The high-melt filaments forming the backing fabric and pile yarns have a softening or melt point of over 340° F.

The invention includes an arrangement in which the backing fabric is woven from continuous split film strips formed of polyproplene or polyethylene, alone or in combination. This backing would have a melt point to allow thermal bonding with the low melt filaments of the pile yarns.

The pile yarns are formed of a blend of nylon or polyester and polypropylene or polyethylene cut staple filaments spun together. The filaments are cut to a staple length of between 6" and 8". The nylon and polyester filaments are the high-melt and the polypropylene and polyethylene filaments are the low-melt.

In another arrangement, the pile yarn could consist of nylon staple filaments and nylon continuous filaments. The continuous filaments would be coated with polyethylene and form the core of the combination yarn.

The invention includes the method of forming a stable tufted pile carpet in which the pile forming yarns are thermally bonded with the backing fabric. The method comprises forming a fibrous substrate of intermingled synthetic high-melt filaments and synthetic low-melt filaments as the backing fabric. The method also includes providing a pile yarn formed of a blend of high-melt synthetic staple filaments and low-melt synthetic staple filaments as a pile forming yarn, and tufting with a tufting machine this pile forming yarn into the backing fabric so that the pile tufts form a face of the tufted pile carpet. Applying sufficient heat to the tufted pile fabric to cause the low-melt filaments forming both the backing fabric and the low-melt filaments forming said pile yarn to soften and intermingle. Removing the heat so that the pile tufts fuse bonded with the backing fabric at points of mutual contact. The bond can be enhanced with pressure during cooling.

The method may include selecting as the synthetic low-melt filaments polypropylene filaments. Also selecting as the high-melt filaments polyester filaments.

The method further includes providing a tufted pile fabric having a pile face formed of substantially only the synthetic high-melt filaments by causing the synthetic low-melt filaments of the pile yarns to withdraw during heating to the area of bonding with the synthetic low-melt filaments of the backing fabric.

DESCRIPTION OF THE DRAWINGS

The invention will be more readily understood from a reading of the following specification and by reference to the accompanying drawings forming a part thereof, wherein an example of the invention is shown and wherein.

Figure 1:
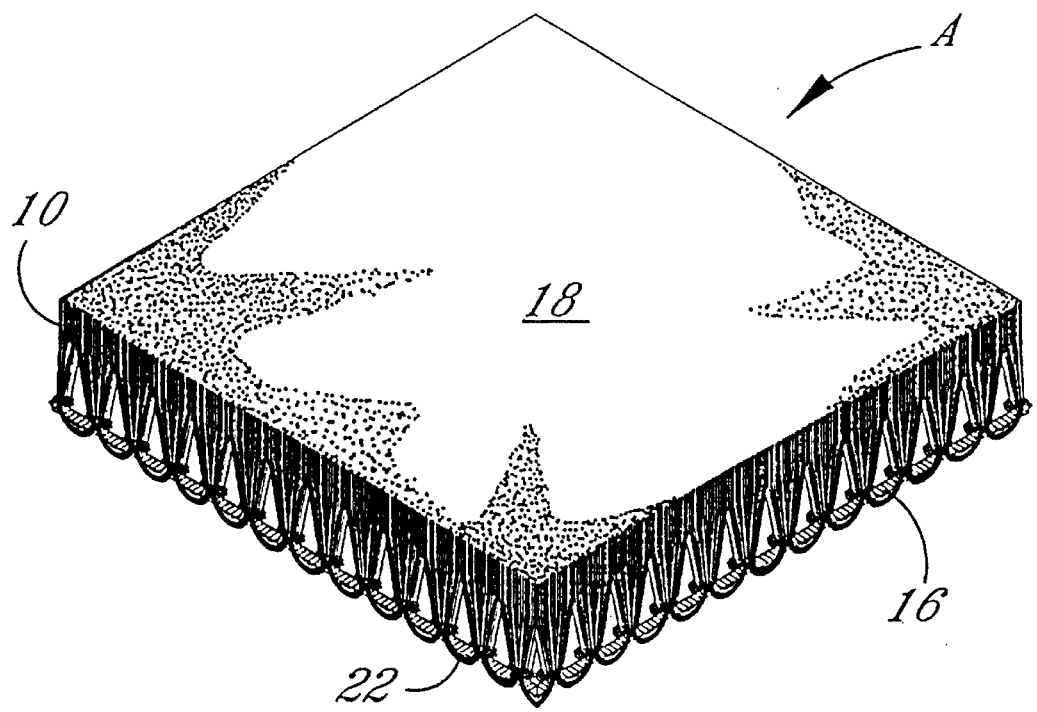
FIG. 1 is a perspective view of the cut pile tufted fabric of the invention.

The construction designed to carry out the invention will hereinafter be described, together with other features thereof.

DESCRIPTION OF A PREFERRED EMBODIMENT

Referring now to the drawings, the invention will now be described in more detail.

The present invention comprises a tufted pile fabric formed from a backing fabric having pile tufts extending there through to form a pile face on one side thereof. The pile tufts form a U or back stitch on the back side of the backing fabric with the opposed legs thereof extending through the backing fabric so that each leg forms a pile tuft. The pile tufts are heat or fuse bonded with the backing fabric in tandem with the tufting operation.

The tufted pile fabric A as shown in FIG. 1 is of the type generally referred to as a "plush" or "cut" pile fabric. Pile yarns or tufts 10 are shown forming back stitch 22 on the back side of backing fabric 16 while the legs of pile yarn 10 extend through the backing fabric forming a pile face 18. The pile face of course could be formed of pile loops or of tufts of cut pile yarn. Pile yarns 10 are adhered with backing fabric 16 with a fuse bond. The term "fuse bond" is defined as when components of both the pile yarns and the backing fabric are softened to the point that they flow together and intermingle forming an integration to form the bond.

Figure 2:
FIG. 2 is a side sectional view of a blended synthetic yarn used as the pile yarn of the tufted pile fabric of the invention.

Referring now to FIG. 2, pile yarn 10 is shown as being formed of a blend of cut staple synthetic filaments 12 and 14 which have been spun into yarn 10. Staple filaments 12 are comprised of a synthetic material designated as low-melt. Synthetic materials so designated have a melt temperature in the range of 200° to 340° F. It has been found that filaments of polypropylene or certain polyesters are most suitable for use as the low-melt filaments of blended pile yarn 10. It is noted, however, any synthetic material within the desired melt range is acceptable. Staple filaments 14 are comprised of synthetic material designated as high-melt and have a softening or melt temperature of greater than 340° F. It has been found that high-melt polyesters are most desirable for forming staple filaments 14. Again, other synthetic materials having a melting point in the desired range such as polyamides are also acceptable.

Pile yarn 10 is formed with a blend of approximately 20% low-melt staple filaments and approximately 80% high-melt staple filaments. It is possible for the pile yarn to have a range of between 5% and 50% content of the low-melt staple filaments and be acceptable. The staple length of the staple filaments is normally between 2" and 10" with 6" to 8" staple length being the preferred range. The low-melt staple length may be the same as, shorter or longer than the staple length of the high-melt staple.

Alternatively, the pile yarn could be formed of polyester staple filaments blended with nylon filaments which are coated with polyethylene. In this arrangement, the polyethylene forms the low melt synthetic and the nylon and polyester the high melt synthetic. The nylon may be crimped prior to coating. The low melt coating in this example acts in the same manner as a low melt filament when subjected to heat and thermally blends with the low melt synthetic of the backing fabric to form a thermal bond with the high melt polyester and nylon filaments.

Figure 3:
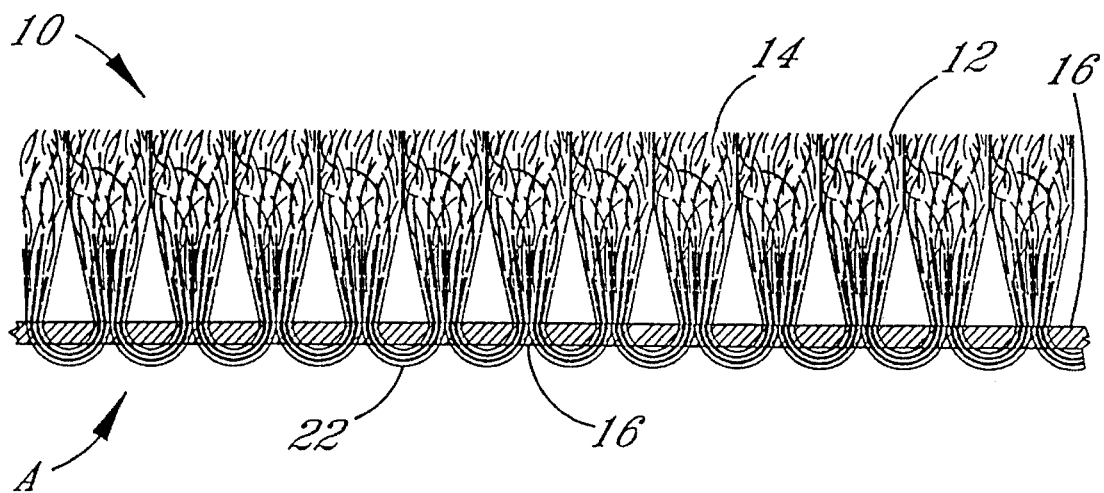
FIG. 3 is a sectional side view of the tufted carpet of the invention prior to bonding.

Backing fabric 16 as best seen in FIG. 3 preferably is comprised of a nonwoven substrate formed of a blend of low-melt and high-melt synthetic filaments intermingled. Preferably the low-melt filaments are formed of polypropylene and the high-melt filaments are formed of polyester or nylon. The ratio of the two is preferably the same as for pile yarn 10 or between 5% and 50% low-melt filament content and between 50% and 95% high-melt filament content. The filaments forming substrate 16 may be continuous in which case they are air entangled and bonded with a mechanical bond. Alternatively, the filaments may be cut staple in which case they are needled and mechanically bonded. The resulting substrate in both instances is porous and capable of breathing. Such substrates are commercially available by suppliers such as the Freudenberg Corp or Hoechst Celense Co.

It is, of course, understood that substrate 16 could be formed as a composite film or a woven fabric. Also, other polymeric thermoplastic filaments may be used such as polyolefins, acrylics and polyamides.

The woven backing fabric may be formed of split film strips or filaments of polypropylene and/or polyethylene. This backing fabric could be woven as a blend of high and low melt split strips or filaments with one set of strips woven as the weft and the other as the warp. Alternatively the strips of polyethylene and polypropylene could be arranged in an alternating arrangement in one or each fabric directions. An additional alternative arrangement would be to provide a backing of all polypropylene, a low melt, and to provide as the low melt of the blend forming the pile yarn, polyethylene. Because the melt point of polyethylene is slightly higher than that of polypropylene, at the point in time when the polyethylene had become soft, only the outer surfaces of the polypropylene would have become soft. This condition would allow thermal bonding between the outer surfaces of the backing fabric and the low melt filaments of the pile yarn while at the same time maintaining the integrity and stability of the backing fabric because the inner area of strips which has not yet become soft. Preferably the slit filaments are cut to be between 400 and 1200 denier.

Figure 5:
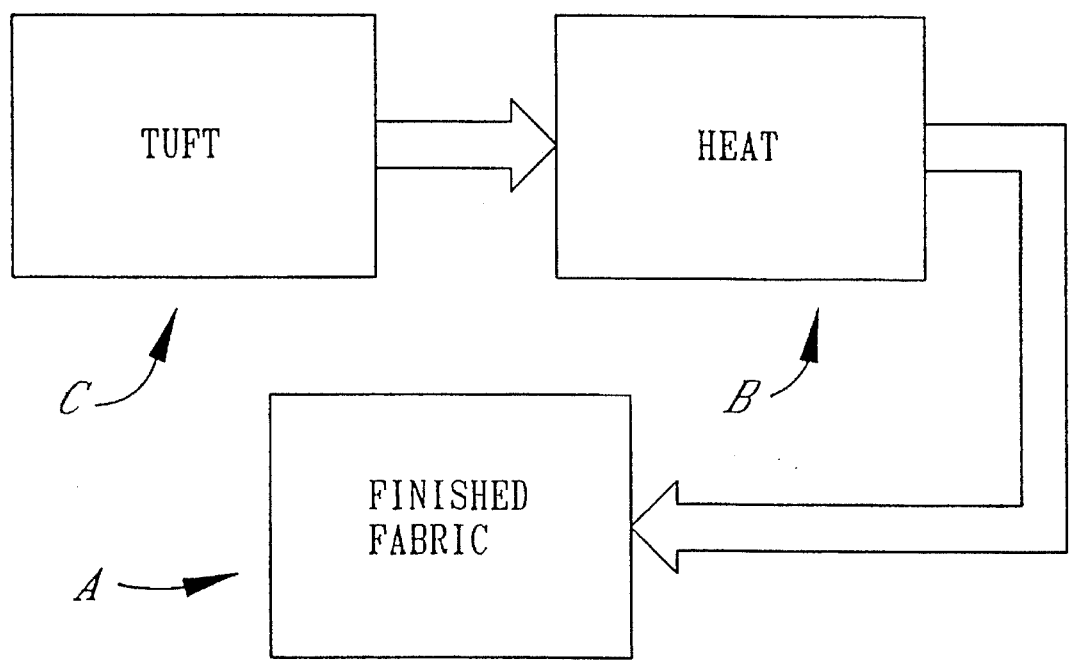
FIG. 5 is a process diagram of the method of forming the tufted pile fabric of the invention.
Figure 4:
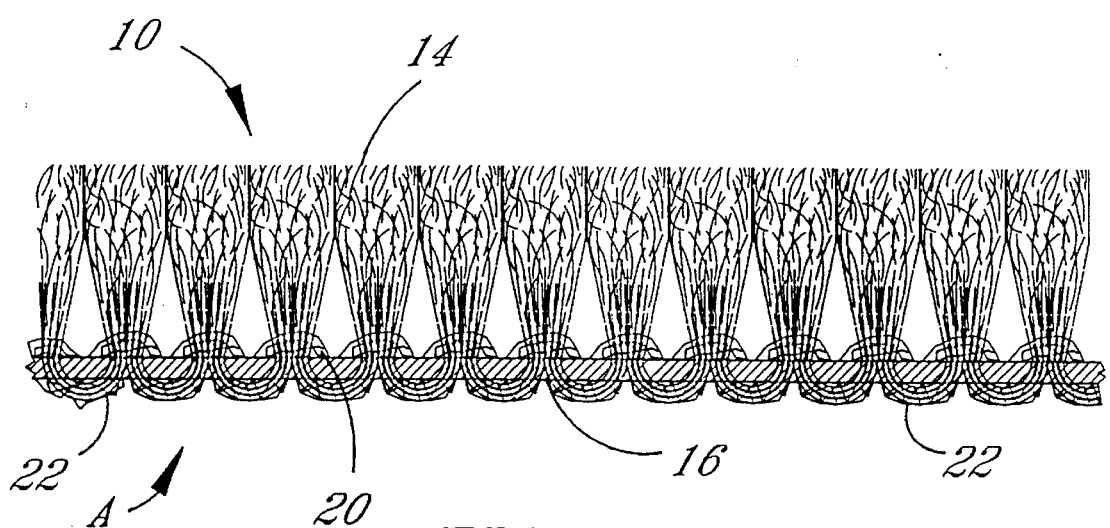
FIG. 4 is a sectional side view of the tufted carpet of the invention after bonding.

FIG. 5 is a diagram of the forming operation where backing fabric 16 and pile yarns 10 are continuously fed to a tufting station C where pile yarns 10 are tufted into backing fabric 16 as earlier described. As tufted fabric A passes out of station C it immediately passes into a heating station B with no handling. Here heat, such as by convection air or radiant heat, is applied to the tufted fabric at about 300° F. The heat causes the low-melt filaments in both pile yarns 10 and backing fabric 16 to soften and to mix, mingle or bond. As low-melt filament 12 in the pile yarn are heated they begin to shrink and draw away from pile face 18 and move towards back stitch 22 and the intersection of the pile yarn with base fabric 16. As the pile fabric passes out of heating station B, the fabric is cooled causing the molten low-melt filaments of the pile yarns and base fabric to solidify and bond about the high-melt filaments of both backing fabric 16 and pile yarns 10. FIG. 4 illustrates the points of bonding between fabric 16 and yarns 10 at 20.

It is noted that a pressure drum or a porous drum through which a suction pressure is created by drawing air therethrough may be used to carry the tufted fabric away from heating station B. The suction created by the air being drawn through the pores of the drum draws the tufted fabric against the drum surface during cooling causing the fabric forming yarns to be tightly drawn together. This action improves the bonding action between backing fabric 16 and pile yarn 10.

The finished pile fabric is removed from the tufting machine after cooling.

It has been found that the low-melt filaments 12 forming the pile yarns should be between 2 and 18 denier while the high-melt filaments 14 may be the same size or slightly larger. The size for filaments 14 is between 3 and 8 denier. Smaller denier for the low-melt filaments tend to more fully shrink and move completely toward the base of the tuft. In so doing the low-melt filaments form a much stronger thermal bond between the backing fabric and the pile tuft. By shrinking away from pile face 18, the low-melt filaments 12 allow high-melt filaments 14 at their cut ends forming the file face 18 to expand and enhance the uniformity and feel of the pile face.

Pile fabrics formed by the above described process are produced with a minimum of handling. The fabric finds excellent use as liners in automobiles as floor carpeting, liners for trunks, map pockets, covers for door panels, speaker grills, package shelves, seat backs, etc. The fabric may be enhanced by applying a low-melt coating to one surface of the base fabric prior to tufting.

Figure 6:
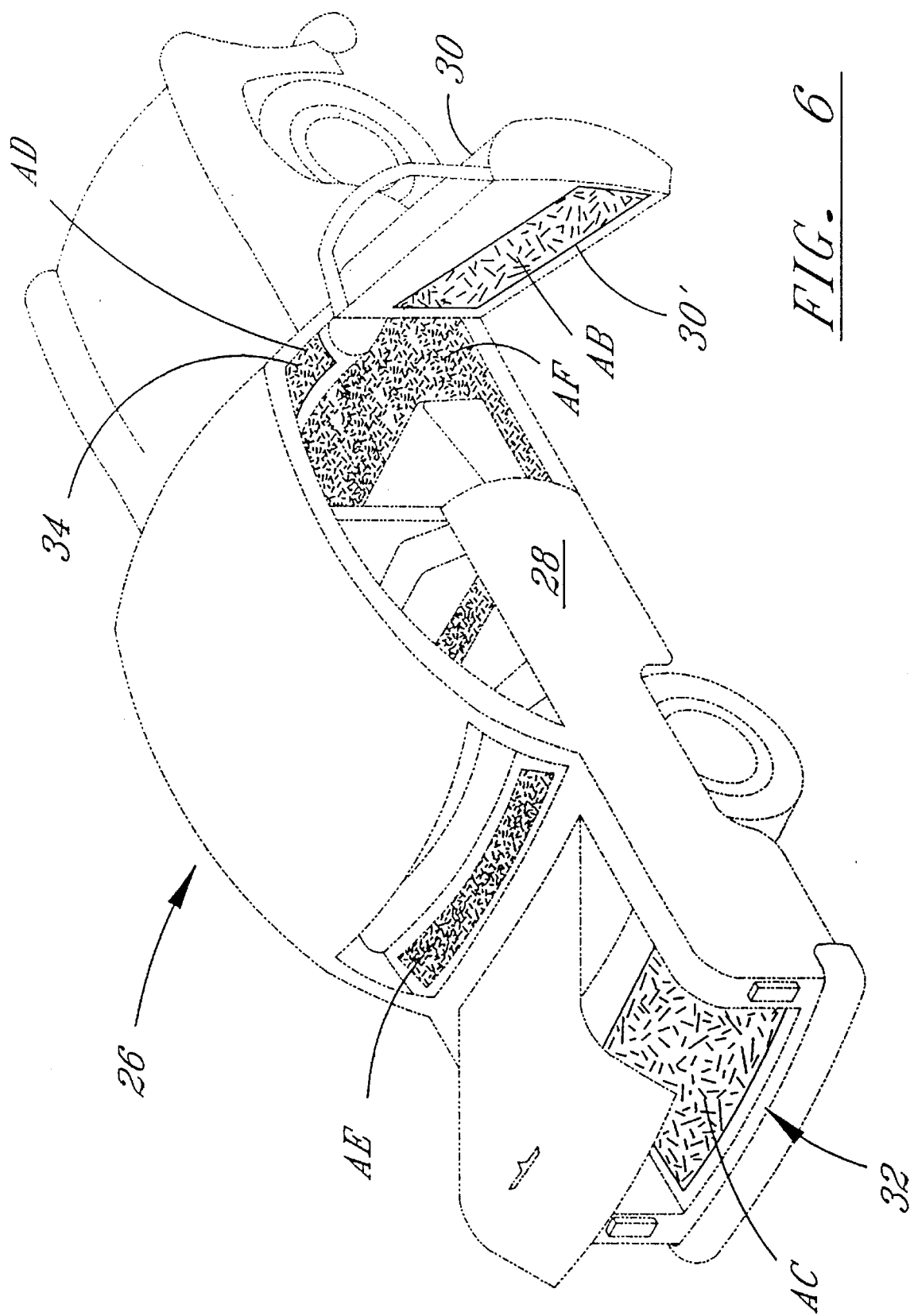
FIG. 6 is a perspective view showing the tufted fabric of the invention incorporated with the interior of an automobile.

Referring now to FIG. 6, there is shown an outline of an automobile 26 having an interior 28. A door 30 is illustrated to include door panel 30'. Tufted pile carpet A has been shaped as shown at AB and secured with panel 30' to form a luxurious finished appearance. Pile carpet A has also been shaped and molded to conform with and cover the floor of the interior 28 at AF and to line trunk area 32 as shown at AC. The drawing also illustrates pile carpet A shaped to cover speaker 34 at AD and to cover the package shelf at AE. Numerous other areas could be covered with pile fabric A because of its luxury appearance and its porous light weight construction.

Because the pile of pile fabric A does not shed easily, the fabric is ideal for such type uses. Because of its lower production cost, it is more readily available for use in a wider range of automobiles.

While a preferred embodiment of the invention has been described using specific terms, such description is for illustrative purposes only, and it is to be understood that changes and variations may be made without departing from the spirit or scope of the following claims.

What is claimed is:

1. A stable, uncoated, tufted pile fabric having a backing fabric with pile yarns extending from said backing fabric to form the face of the pile fabric; wherein said pile fabric comprises:

a woven fibrous substrate forming said backing fabric that is comprised of warp and weft yarns formed from a blend of synthetic high-melt filaments having a high-melt temperature and synthetic low-melt filaments having a low-melt temperature;

said pile yarns comprising a blend of staple, synthetic high-melt pile filaments formed of a high-melt temperature synthetic material and staple synthetic low-melt pile filaments formed of low-melt temperature synthetic material;

said low-melt filaments of the woven fibrous substrate being thermally bonded with said low-melt staple pile filaments in said tufted pile fabric;

whereby a tufted pile fabric is provided in which said pile yarns are thermally bonded with said backing fabric to form a stable, tufted pile fabric without a backing coating.

2. The pile fabric of claim 1 wherein said pile yarns comprise between 50% and 95% of said staple high melt pile filaments that are composed of polyester or nylon staple monofilaments and between 5% and 50% of said staple low-melt pile filaments that are composed of polypropylene or polyethylene staple monofilaments.

3. The pile fabric of claim 1 wherein said warp and weft yarns of the woven fibrous substrate comprise a blend of between 50% and 95% of high-melt polyester or nylon cut staple filaments and between 5% and 50% of low-melt polypropylene or polyethylene staple filaments.

4. The pile fabric of claim 1 wherein said low-melt filaments of said woven fibrous substrate and said low-melt pile staple filaments have a melting point of less than 340° F.

5. The pile fabric of claim 1 wherein said high-melt filaments of said woven fibrous substrate and said high-melt pile staple filaments have a melting point of over 340° F.

6. The pile fabric of claim 1 wherein said pile yarns comprise a blend of polyester or polypropylene staple filaments spun together and nylon or polyethylene staple filaments spun together.

7. The pile fabric of claim 6 wherein said high-melt pile staple filaments are between 2" and 10" in length.

8. The pile fabric of claim 1 wherein said low-melt pile staple filaments are between 2" and 10" in length.

9. An uncoated tufted pile fabric for use as an upholstery fabric for inner surfaces of automobile interiors, said pile fabric comprising:

a woven backing fabric comprised of warp and weft yarns formed of a blend of high-melt and low-melt synthetic filaments;

pile yarns penetrating through said backing fabric to form individual cut pile tufts on a first side thereof which compose a fabric face and back stitches on a second side thereof interconnecting pairs of said pile tufts, said pile yarns being formed of a blend of high melt and low melt synthetic pile staple filaments;

said low-melt filaments of the woven backing and low melt pile staple filaments being thermally bonded together locking said pile yarns with said backing fabric and forming said fabric face of substantially only said high melt filaments;

said pile fabric being adapted to overlay at least one of a floor, a trunk, back tray, door panel, or speaker grill of said automobile interiors.

\* \* \* \* \*